United States Patent
Baek et al.

(10) Patent No.: US 10,490,860 B2
(45) Date of Patent: Nov. 26, 2019

(54) BATTERY PACK

(71) Applicant: SAMSUNG SDI CO., LTD., Yongin-si, Gyeonggi-do (KR)

(72) Inventors: Woonseong Baek, Yongin-si (KR); Sejin Ji, Yongin-si (KR); Hyeoncheol Jeong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 394 days.

(21) Appl. No.: 14/844,015

(22) Filed: Sep. 3, 2015

(65) Prior Publication Data

US 2016/0268641 A1 Sep. 15, 2016

(30) Foreign Application Priority Data

Mar. 11, 2015 (KR) .................. 10-2015-0033792

(51) Int. Cl.

| | |
|---|---|
| *H01M 10/42* | (2006.01) |
| *H01M 2/10* | (2006.01) |
| *B62M 6/90* | (2010.01) |
| *H02J 7/00* | (2006.01) |
| *H02M 7/00* | (2006.01) |

(52) U.S. Cl.
CPC ............ *H01M 10/425* (2013.01); *B62M 6/90* (2013.01); *H01M 2/1077* (2013.01); *H02J 7/0042* (2013.01); *H01M 2010/4271* (2013.01); *H01M 2220/20* (2013.01); *H02M 7/003* (2013.01)

(58) Field of Classification Search
CPC ................. B62M 6/90; H01M 10/425; H01M 2010/4271; H01M 2220/20; H01M 2/1077; H02J 7/0042; H02M 7/003
See application file for complete search history.

(56) References Cited

U.S. PATENT DOCUMENTS

| | | | |
|---|---|---|---|
| 2006/0038537 A1 | 2/2006 | Heigl | |
| 2010/0116570 A1* | 5/2010 | Sugawara | ................ B60K 1/04 180/65.1 |
| 2013/0118825 A1 | 5/2013 | Kwag et al. | |
| 2013/0134944 A1 | 5/2013 | Son | |
| 2013/0241170 A1 | 9/2013 | Talavasek et al. | |

FOREIGN PATENT DOCUMENTS

| | | |
|---|---|---|
| EP | 2 476 575 A1 | 7/2012 |
| KR | 10-2013-0052919 A | 5/2013 |
| KR | 10-2013-0061019 A | 6/2013 |
| KR | 10-2013-0075378 A | 7/2013 |

OTHER PUBLICATIONS

Extended European Search Report dated Aug. 3, 2016 in Corresponding European Patent Application No. 16160016.8.
European Office Action dated Apr. 30, 2019.

* cited by examiner

*Primary Examiner* — Lingwen R Zeng
(74) *Attorney, Agent, or Firm* — Lee & Morse, P.C.

(57) ABSTRACT

A battery pack including at least one battery cell, a protective circuit module on a side of the at least one battery cell, and a case including the protective circuit module and the at least one battery cell. The protective circuit module includes a battery management system, an inverter, and an output terminal to supply power for driving a motor.

12 Claims, 2 Drawing Sheets

BATTERY PACK

CROSS-REFERENCE TO RELATED APPLICATION

Korean Patent Application No. 10-2015-0033792, filed on Mar. 11, 2015, and entitled, "Battery Pack," is incorporated by reference herein in its entirety.

BACKGROUND

1. Field

One or more embodiments described herein relate to a battery pack.

2. Description of the Related Art

Interest in alternative energy sources has increased in recent years. As a result, secondary batteries are being used, not only in mobile electronic devices such as cellular phones, laptops, camcorders and personal digital assistants, but also as power sources for e-bikes and electric vehicles.

The secondary batteries may be manufactured in battery pack form, that includes battery cells and a battery management system (BMS). The battery cells may be charged or discharged by external power or an external load through external terminals in the battery pack. The BMS measures voltage and current of the battery cells, controls protective operations of the battery cells based on the measured data, computes the battery state of charge, and transfers the processed information to an external system.

E-bikes or electric vehicles may use battery packs to drive motors and may include additional controller systems for controlling such motors and battery packs.

SUMMARY

In accordance with one or more embodiments, a battery pack includes at least one battery cell; a protective circuit module on a side of the at least one battery cell; and a case including the protective circuit module and the at least one battery cell, wherein the protective circuit module includes a battery management system, an inverter, and an output terminal to supply power for driving a motor. The inverter may be spaced apart from the battery management system. The protective circuit module may include a gate driver. The gate driver may be between the inverter and the battery management system. The inverter may be spaced from the gate driver. The output terminal may be coupled to a motor connector exposed outside the case. The protective circuit module may include a charge/discharge terminal of the at least one battery cell on a side of the output terminal. The charge/discharge terminal may be coupled to a charge/discharge connector exposed outside the case.

In accordance with one or more other embodiments, a battery pack includes a terminal; a connector; at least one battery cell; a protective circuit module for the at least one battery cell; and a housing including the at least one battery cell and the protective circuit, wherein the terminal is a charge/discharge terminal for the at least one battery cell, the connector is to output power to a motor, the terminal and connector extend from an external surface of the case and are connected to the protective circuit module, and the protective circuit module is to perform a control function for the least one battery cell and a control function for the motor. The protective circuit module may be on a single printed circuit board. The protective circuit module may include a battery management system and a circuit to control output of power for the motor. The protective circuit module may include a battery management system and an inverter to control at least one of a frequency or a voltage of the motor. The motor may power a vehicle. The vehicle may be an e-bike. The protective circuit module may be coupled to a surface of a housing of the at least one battery cell.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
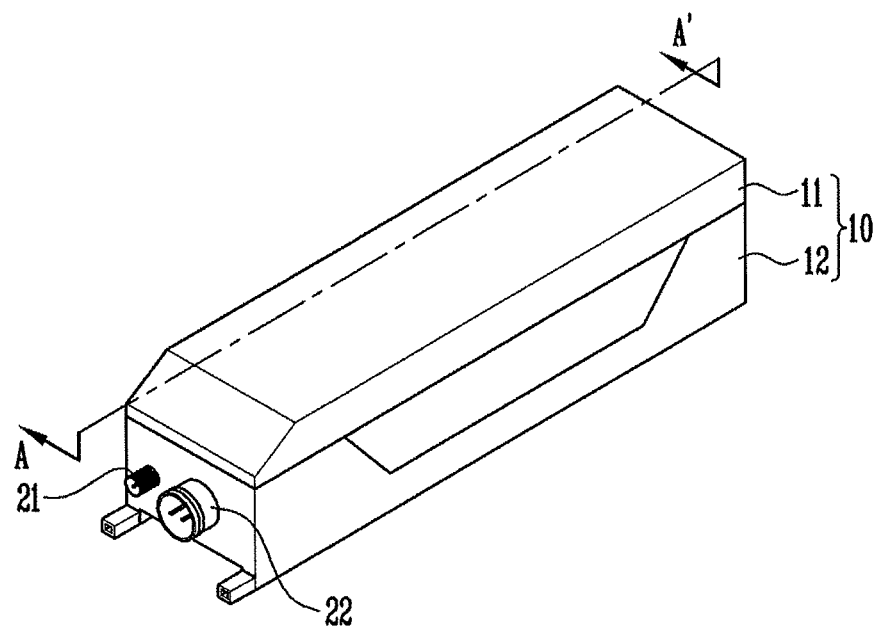
FIG. 1 illustrates an embodiment of a battery pack.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Figure 2:
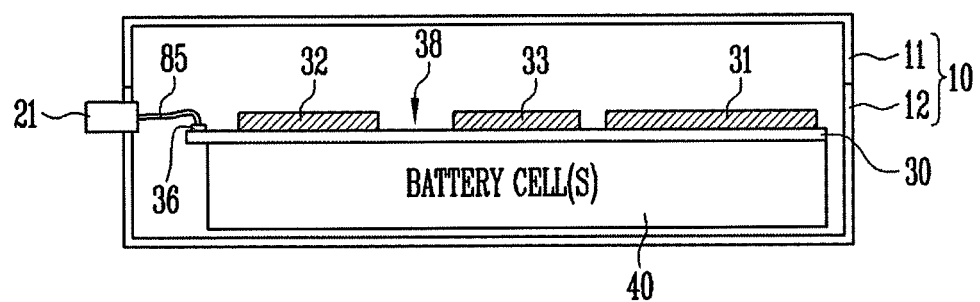
FIG. 2 illustrates a view along section line A-A' in FIG. 1.

FIG. 1 is a perspective view illustrating an embodiment of a battery pack, and FIG. 2 is a cross-sectional view of the battery pack taken along section line A-A' in FIG. 1. Referring to FIGS. 1 and 2, the battery pack includes at least one battery cell 40, a protective circuit module 30, and a case (or housing) 10 receiving the protective circuit module 30 and the at least one battery cell 40.

The protective circuit module 30 may be located on predetermined side of the at least one battery cell 40, e.g., an upper side surface of a housing of the at least one battery cell 40. In another embodiment, the protective circuit module may be located on another side of the at least one battery cell 40. The protective circuit module 30 includes a battery management system (BMS) 31, an inverter 32, an output terminal 22 for outputting power for driving a motor, and a gate driver 33. A control function for the battery cell 40 and a motor control function may be integrated in the protective circuit module 30 of the battery pack.

The at least one battery cell 40 may be charged with a constant voltage and discharged. The at least one battery cell 40 may be coupled in series or parallel. The number of battery cells 20 may vary depending, for example, on the capacity of an external load, e.g., the power to be provided for the motor.

The case 10 includes the protective circuit module 30 and the at least one battery cell 40. The case 10 includes an upper case or section 11 and a lower case or section 12. A charge/discharge connector 21 and a motor connector 22 may be coupled to an outside surface of one of the cases, e.g., the lower case 12. The charge/discharge connector 21 and the motor connector 22 are coupled to the charge/discharge terminal 36 and the output terminal 37, respectively, of the protective circuit module 30.

An electric drive (e.g., an e-bike) may use a variety of components in order to be driven. For example, the e-bike may use a motor and a controller system to control a battery pack serving as an energy source for driving the motor. As such, in some proposed arrangements, the battery pack for the e-bike may use an additional controller system. However, according to one or more embodiments, the battery cell 40 and a controller system for driving the motor may be in the battery pack. A motor connector 22 may be used, instead of a wire, that is coupled to the motor in order to drive the electric drive. Thus, according to one embodiment, no additional controller system is needed because the battery management and control functions and the motor control functions are performed by the protective circuit module 30 in the case. The protective circuit module may be included, for example, on a single printed circuit board 80.

Figure 3:
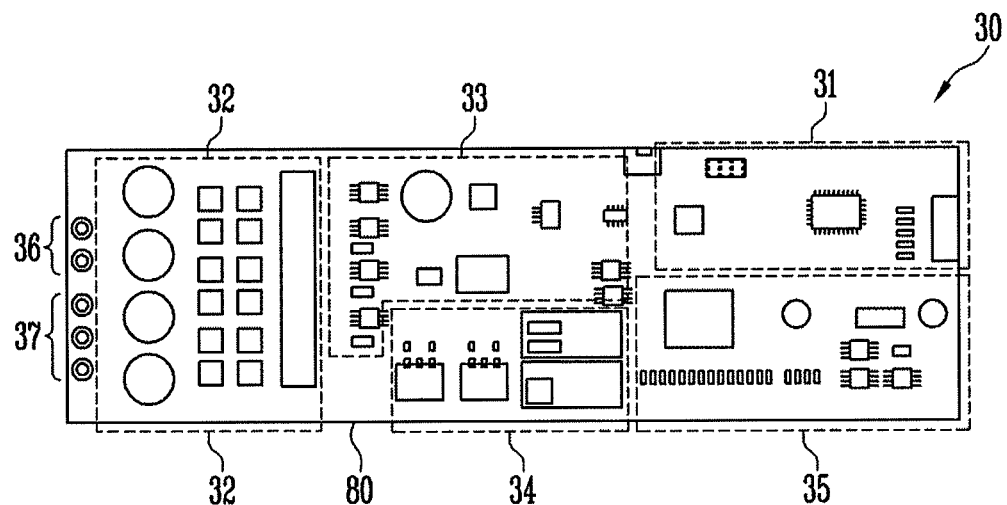
FIG. 3 illustrates an embodiment of a protective circuit module.
Figure 4:
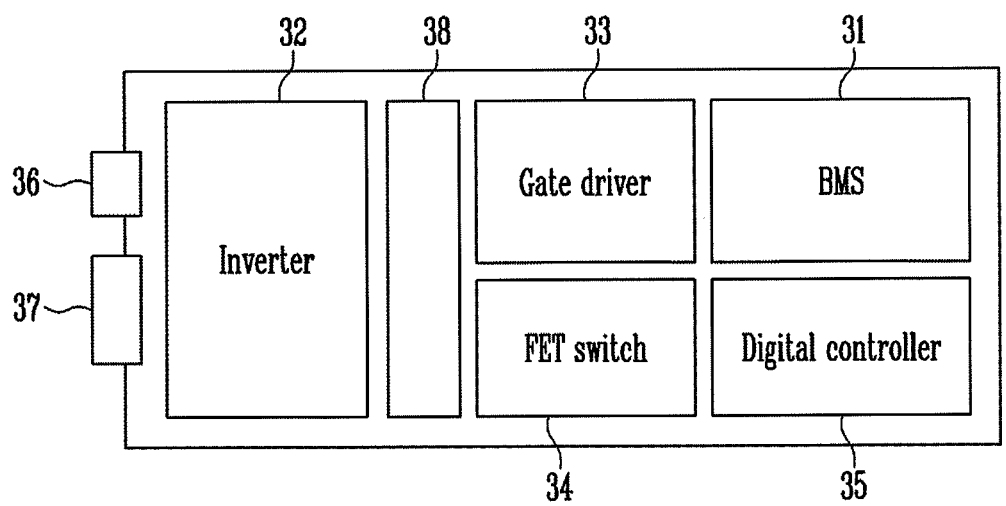
FIG. 4 illustrates an embodiment of an internal configuration of the battery pack.

FIG. 3 illustrating a plane view of the protective circuit module 30 of a battery pack. FIG. 4 illustrates an example of functional blocks of the battery pack. Referring to FIGS. 3 and 4, the protective circuit module 30 includes a BMS 31, an inverter 32, a gate driver 33, a field effect transistor (FET) 34, a charge/discharge terminal 36, and an output terminal 37 for providing power for driving the motor. The protective circuit module 30 may also include a digital controller 35 that digitizes internal signals and a communication terminal that receives, for example, hall sensor information.

The inverter 32 may be spaced from the BMS 31 on the printed circuit board 80, to thereby prevent interruption between the inverter 32 and the BMS 31. Since both the inverter 32 and the gate driver 33 function as switches, the inverter 32 and the gate driver 33 may be spaced from each other by a predetermined distance to prevent an interruption therebetween.

The gate driver 33 may be between the inverter 32 and the BSM 31. A space 38 may be provided between the inverter 32 and the gate driver 33. This space allows the inverter 32 and the gate driver 33 to be separated from one another by a predetermined distance. The FET 34 may be between the inverter 32 and the BMS 31 at a location that does not overlap the gate driver 34. The FET 34 may function as a switch that charges and discharges the battery cell 40. The protective circuit module 30 may be electrically coupled to the at least one battery cell 40.

On one side of the protective circuit module 30, a charge/discharge terminal 36 and an output terminal 37 may be formed for driving a motor. The charge/discharge terminal 36 and the output terminal 37 are coupled to the charge/discharge connector 21 and the motor connector 22, respectively. The charge/discharge connector 21 and the motor connector 22 are coupled to an external surface of the case 10 (see, e.g., FIGS. 1 and 2) and may be connected to the protective circuit module 30 via wires 85.

An external power system may be connected to the charge/discharge connector 21. The battery cell 40 may be charged based on power from this external system. If an external load of an external system, for example, from which the external power is separated, is coupled to the charge/discharge connector 21, discharge of power from the battery cell 40 may be performed to the external load. The motor connector 22 may provide power for driving the motor of the e-bike.

The inverter 32 may function as a switch. By controlling the frequency and voltage of the motor, the inverter 32 may more effectively operate the motor. As the frequency and the voltage of the motor are controlled, the inverter 32 may control the number of motor rotations.

The gate driver 33 may be a terminal for driving motor. The gate driver 33 may generate output signals for driving the FET of the inverter 32. The gate driver 33 may perform the function of current amplification necessary for driving the FET of the inverter 32 and the function of controlling the voltage of the gate terminal.

The FET 34 may perform the function of a charge or discharge switch for the at least one battery cell 40. The FET 34 may perform charging or discharging of the battery pack. In the FET 34, the direction of connection between a source and a drain of the charge device FET may be set to a direction that is opposite to the discharge device FET. With such structure, the FET of the charge device may be connected to limit current flow from the charge/discharge terminal 21 to the battery cell 40. The FET of the discharge device may be connected to limit current flow from the at least one battery cell 40 to the charge/discharge terminal 21. In another embodiment, the switch for each of the charge device and the discharge device may be different from a FET.

The BMS 31 may include a detecting portion, a current monitoring portion, and a controller. The detecting portion detects a voltage of the at least one battery cell 40, by being coupled to the at least one battery cell 40 and by detecting a charge/discharge current. The detecting portion may operate the charge device and the discharge device by control of the controller.

If an external system which is coupled to external power is coupled to the at least one battery cell 40, the detecting portion may, under the control of the controller, set the FET of the charge device to ON and the FET of the discharge device to OFF to allow the at least one battery cell 40 to be charged. If an external load of the external system is coupled to the battery cell 40, the detecting portion may, under control of the controller, set the FET of the charge device to OFF and the FET of the discharge device to ON to discharge the at least one battery cell 40.

The detecting portion may be implemented, for example, by an integrated circuit (IC) or an analog front end (AFE). The voltage or current detected by the detecting portion may be transferred to the current monitoring portion and the controller as an analog signal. The analog information may be converted to digital information through a digital controller 35.

In accordance with one or more embodiments, the protective circuit module 30 of the battery pack may not require any additional controller system for controlling the motor, outside of the battery pack, by including the output terminal 37 for driving motor. Also, the battery pack may be used to power the motor of e-bikes as well as other types of electric vehicles or devices.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:
   at least one battery cell;
   a protective circuit module on a side of the at least one battery cell; and
   a case accommodating the protective circuit module and the at least one battery cell, wherein
   the protective circuit module includes a battery management system to manage the at least one battery cell, an inverter to control a motor, a field effect transistor (FET) to perform charging or discharging of the at least one battery cell, a gate driver for driving the inverter, and an output terminal to supply power for driving the motor, wherein:
   the FET and the gate driver are between the battery management system and the inverter in a first direction, and are adjacent to each other in a second direction perpendicular to the first direction,
   the battery management system, the inverter, the FET, the gate driver, and the output terminal are on a single printed circuit board of the protective circuit module, and
   the inverter is spaced apart from the gate driver and the FET by a predetermined distance in the first direction to prevent an interruption therebetween.

2. The battery pack as claimed in claim 1, wherein the inverter is spaced apart from the battery management system on the single printed circuit board.

3. The battery pack as claimed in claim 1, wherein the gate driver is between the inverter and the battery management system on the single printed circuit board.

4. The battery pack as claimed in claim 1, wherein the output terminal is coupled to a motor connector exposed outside the case.

5. The battery pack as claimed in claim 1, wherein the protective circuit module includes a charge/discharge terminal of the at least one battery cell adjacent to the output terminal.

6. The battery pack as claimed in claim 5, wherein the charge/discharge terminal is coupled to a charge/discharge connector exposed outside the case.

7. A battery pack, comprising:
   a terminal;
   a connector including an output terminal to supply power for driving a motor;
   at least one battery cell;
   a protective circuit module for the at least one battery cell, the protective circuit module including a battery management system to manage the at least one battery cell, an inverter to control the motor, a field effect transistor (FET) to perform charging or discharging of the at least one battery cell, and a gate driver for driving the inverter; and
   a case accommodating the at least one battery cell and the protective circuit module,
   wherein the terminal is a charge/discharge terminal for the at least one battery cell, the connector is to output power to the motor, the terminal and connector extend from an external surface of the case and are connected to the protective circuit module, wherein:
   the FET and the gate driver are between the battery management system and the inverter in a first direction, are adjacent to each other in a second direction perpendicular to the first direction,
   the battery management system, the inverter, the FET, the gate driver, and the output terminal of the connector are on a single printed circuit board of the protective circuit module, and
   the inverter is spaced apart from the gate driver and the FET by a predetermined distance in the first direction to prevent an interruption therebetween.

8. The battery pack as claimed in claim 7, wherein the inverter controls at least one of a frequency or a voltage of the motor.

9. The battery pack as claimed in claim 7, wherein the motor is to power a vehicle.

10. The battery pack as claimed in claim 9, wherein the vehicle is an e-bike.

11. The battery pack as claimed in claim 7, wherein the protective circuit module is coupled to a surface of a housing of the at least one battery cell.

12. The battery pack as claimed in claim 1, wherein the the gate driver outputs a driving signal for a field effect transistor (FET) included in the inverter.

* * * * *